April 4, 1939. W. H. VENABLE 2,153,030
DEVICE FOR FEEDING MATERIAL
Filed Aug. 27, 1937
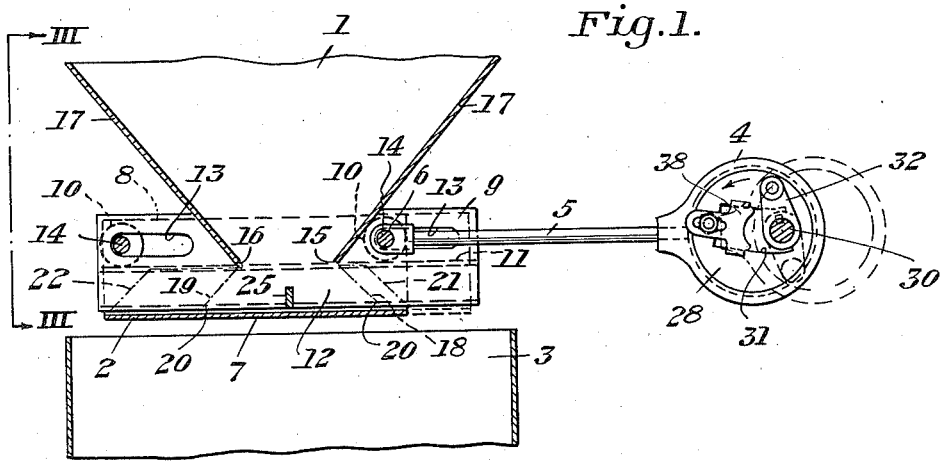
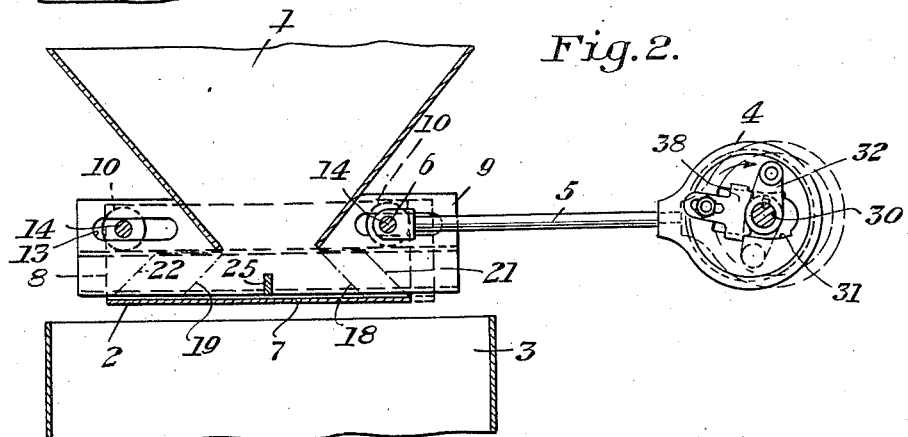
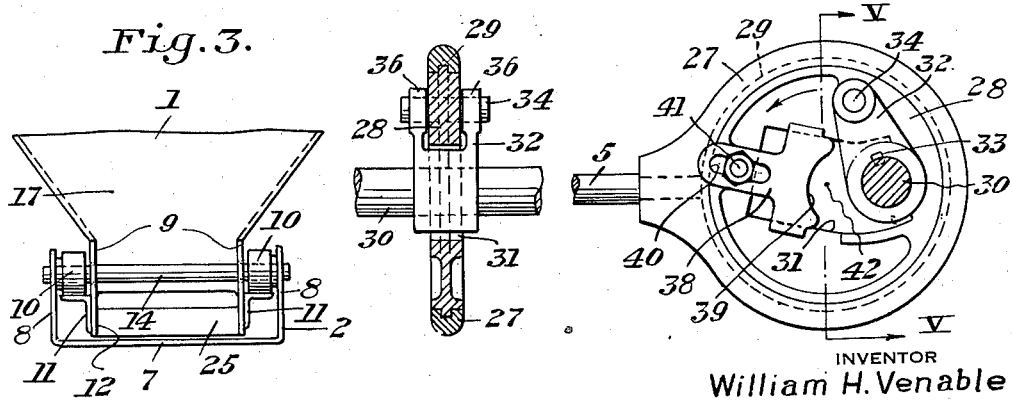
INVENTOR
William H. Venable
by Stebbins, Blenko & Parmelee.
His Attys.

Patented Apr. 4, 1939

2,153,030

UNITED STATES PATENT OFFICE 2,153,030

DEVICE FOR FEEDING MATERIAL

William H. Venable, Pittsburgh, Pa., assignor to Blaw-Knox Company, Blawknox, Pa., a corporation of New Jersey Application August 27, 1937, Serial No. 161,172

9 Claims. (Cl. 221—142)

This invention relates generally to a device for feeding material, and more particularly to a reciprocatory feeder driven by an eccentric. The invention is described herein particularly as applied to feeding crushed or powdered material to a weighing hopper in the making of concrete, but is applicable to other uses.

In feeding the various materials into weighing hoppers, it is desirable that the material be fed rapidly until the approximate desired weight is obtained and thereafter to feed the material more slowly so as to obtain the desired accuracy. The present invention provides means whereby the length of stroke of the reciprocatory feeder is automatically varied upon reversal of the direction of rotation of the drive shaft which operates the eccentric. In carrying out a weighing operation, therefore, the drive shaft for the eccentric may be rotated in one direction until approximately the desired amount is obtained and then the drive shaft is rotated in a reverse direction, which automatically shortens the stroke of the reciprocatory feeder and cuts down the rate of flow of the material into the weighing hopper.

In the accompanying drawings which illustrate the present preferred embodiment of my invention, Figure 1 is a vertical sectional view illustrating the mechanism operating with a long stroke, the direction of rotation of the eccentric disc being indicated by an arrow;

Figure 2 is a view similar to Figure 1, but showing the mechanism operating with a short stroke, the direction of rotation of the cam disc being indicated by an arrow;

Figure 3 is a vertical end elevation of the lower portion of the feed hopper, the reciprocatory feeder which receives material from the feed hopper and delivers it to a receiving hopper, and associated parts, the view being taken on the line III—III of Figure 1;

Figure 4 is an enlarged side elevation of the eccentric shown in Figures 1 and 2, illustrating also the means for adjusting the length of stroke of the connecting rod which is connected to the reciprocatory feeder; and Figure 5 is a vertical section taken on the line V—V of Figure 4.

Referring now more particularly to the accompanying drawing, the material, such for example as gravel, is supplied from a bin 1 to a reciprocatory feeder 2 which delivers it alternately at each end of the feeder into a weighing hopper 3. The reciprocatory feeder 2 is reciprocated by means of an eccentric indicated generally by the reference numeral 4, which will be more particularly described. A connecting rod 5 operatively connected at one end to the eccentric is pivotally connected at its opposite end to the feeder 2 by a pivotal connection 6.

In the figures I have shown the reciprocating feeder as trough shaped, having a flat bottom 7 and sides 8, and mounted for reciprocation in a horizontal plane. This trough is supported by the shafts 6 and 14 which in turn are supported on rollers 10 running on tracks 11. These tracks are long enough to permit spacing the rollers far enough apart to allow the bin bottom to come between them. They are secured to the lower portions 12 of the bin sides, which are made long enough for that purpose, and extend as at 9 beyond the bin bottom at both ends. They are slotted as at 13 to permit free passage of the shafts 6 and 14. However, the feeder 2 need not be mounted on rollers, but may be mounted in any other practical way. For example, it may be swung from pivots attached to the bin.

The lower ends 15 and 16 of the end walls 17 of the feed bin terminate a short distance above the bottom 7 of the feeder. If there were no reciprocation of the feeder and the bin were filled, the material would take its natural slope to the trough bottom, as indicated by the lines 15—18 and 16—19. The length and position of the trough are such that the toes 20 of these material slopes do not extend to the trough ends. However, when the feeder is reciprocated, the material works out endwise of the trough until it reaches the contour indicated by the broken lines 21 and 22. Upon further reciprocation, the material spills over the open ends of the trough alternately at the right-hand end and the left-hand end. When the feeder moves to the right, as viewed in Figure 1, material spills from the left-hand end of the feeder, and as the feeder moves towards the left, the material spills from the right-hand end into the receiving hopper 3.

In order to insure feeding of the material when the feeder is reciprocated, a baffle plate 25 is provided. This baffle plate extends between and is connected to the side walls 12 of the feed bin and is spaced a slight distance above the bottom 7 of the feeder. The baffle plate remains stationary as the feeder is reciprocated. Since the baffle plate contacts with the material resting on the feeder, it acts to wipe off the material from the feeder first from one end and then from the other end of the feeder as the latter is reciprocated. When the trough moves to the right, the material resting on the trough bottom to the right of the baffle plate 25 moves with the trough without sliding thereon, and other material feeds down from above to rest on that portion of the trough which has passed to the right under the baffle plate. However, the material on the trough to the left of the baffle plate cannot move to the right, but slides on the trough bottom, some of it falling off the left-hand end of the trough. When the trough moves to the left, there is spillage at the right-hand end.

In this manner the material is fed into the receiving hopper 3 alternately from each end of the feeder 2. This permits the use of a longer receiving hopper than would be appropriate if the feeder discharged from one end only, as is common with reciprocating feeders, and because the natural slope of various materials commonly requiring measurement seldom is less than 30° and sometimes is as great as 45°, considerable saving in hopper depth may be effected, which is usually an advantage of considerable importance.

The eccentric for automatically changing the length of stroke of the reciprocatory feeder 2 upon reversal of the direction of rotation of the eccentric is shown in detail in Figure 4. The connecting rod 5 is connected to a strap or sheath 27 which surrounds a cam or disc 28, the disc being rotatable within the strap by means of a tongue and groove 29. If the disc 28 is rotated on its center, it will impart no motion to the sheath 27 and, consequently, none to the rod 5; but if the disc 28 be rotated about an axis other than its center, it will with the other parts constitute an eccentric and produce reciprocatory motion.

The driving shaft for the disc 28 is the shaft 30 which rotates in fixed bearings. To it is secured, as by the key 33, an arm 32 which is pivotally connected to disc 28 by the pin 34. The arm 32 may be U-shaped, as shown in Figure 5, to make the construction sturdy and symmetrical, but it might be in the form of a crankshaft if desired. As shown, it has two legs, 36, one lying on each side of the disc 28. The disc 28 is provided with a slot 31 through which the shaft 30 may pass, permitting the shaft 30, or the hub of arm 32 surrounding said shaft, to occupy any position between the ends of the slot 31.

This construction is such that when the shaft 30 is rotated in one direction the disc 28 turns in sheath 27 without imparting thrust or tension to the rod 5, until the shaft 30 bears against one end of the slot; and thereafter the device becomes an eccentric as if the shaft were fixed to the disc in that position—but when the direction of rotation is reversed, the disc 28 turns in sheath 27 without imparting motion to connecting rod 5 until the shaft 30 bears against the other end of the slot; whereupon the device behaves as an eccentric of different stroke or eccentricity. The position of the shaft within the slot may be adjusted by means of an adjustable stop 38 having a contact portion 39 which contacts with the drive shaft 30 when it is rotated in a clockwise direction, viewing Figure 4. The shank of the stop 38 is provided with a slot 40 which receives a bolt 41 which extends through a corresponding slot in the disc. Thus, the stop may be moved to lengthen or decrease the effective length of the slot. I prefer to make the slot and the stop of such dimensions that the stroke may be adjusted from zero to the maximum consistent with the size of the disc 27 and the making of parts of the necessary strength.

When the parts are in the positions indicated in Figures 1 and 4, the stroke of the eccentric and connecting rod 5 is long, whereas when the parts are in the position indicated in Figure 2, they are short. When the drive shaft 30 is rotated in a counter-clockwise direction, as indicated in Figures 1 and 4, the drive shaft remains at the right hand end of the slot 31, viewing Figure 4. This produces a long stroke of the eccentric and connecting rod. In carrying out a weighing operation, the drive shaft 30 is rotated in the direction shown in Figure 4 until approximately the proper amount of material has been delivered from the feeder 2. Then the direction of rotation of the drive shaft is reversed and this automatically shortens the stroke of the reciprocating parts.

In Figure 1 the feeder 2 is shown in full lines in its position farthest to the left. If the shaft 30 be turned anti-clockwise, it will remain in the right-hand end of the slot 31, and one-half turn of the shaft 30 will bring the parts into the positions shown in broken lines. Continued anti-clockwise rotation will maintain the position of the drive shaft in the same end of the slot. However, when the shaft 30 is rotated in a clockwise direction, the disc 28 and slot 31 move to the right from the position shown in Figure 1 to the position shown in Figure 2 and the drive shaft 30 contacts with the stop 38. Upon further clockwise rotation of the drive shaft the reciprocating parts will occupy successively the positions shown in full and in broken lines in Figure 2. Thus, the length of stroke of the reciprocating parts including the feeder 2 and therefore the rate of feed of the material into the receiving hopper 3 may be varied automatically simply by reversing the direction of rotation of the drive shaft. This feature of the invention may be employed in a reciprocating feeder of the ordinary type, discharging material at one end only, and regardless of whether the feeder is placed in a horizontal or inclined position.

When the device is used in connection with weighing means for apportioning concrete, the shaft 30 is caused to rotate in the direction productive of the maximum rate of feed until the greater portion of the desired amount has been fed into the hopper. The rate of feed is then cut down by reversing the direction of rotation, which is very easily done by reversing the driving motor. The feed is continued at the slower rate until the desired total is obtained, at which time the drive is stopped and the flow stops. As the final feed is slow, it is thus possible to obtain the desired amount with accuracy. The reversing and stopping of the motor may be rendered automatic by electric switches controlled by the weighing apparatus, employing well known means not part of this invention.

In the claims, the term "a reciprocatory feeder" is used in its broad sense to include to and fro motion whether that motion be in a plane or in an arc of a circle and to include oscillation as well as true reciprocation in a plane. Although I have illustrated and described the present preferred embodiment of my invention, it is to be understood that the invention is not so limited, but may be otherwise embodied or practiced within the scope of the following claims.

I claim:

1. A device for feeding material, comprising a reciprocatory feeder, eccentric means for reciprocating the feeder, said eccentric means comprising a disc provided with a slot, a drive shaft in the slot, the disc and drive shaft being bodily movable relative to each other, an arm rigidly secured adjacent one end to the drive shaft and pivotally connected adjacent its other end to the disc, and a strap for the disc.

2. A device for feeding material, comprising a reciprocating feeder, a shaft rotatable in either direction for supplying power to reciprocate the feeder, an eccentric on said shaft imparting reciprocal motion of given amplitude to said feeder when the shaft is rotated in one direction, and means for reducing the amplitude of reciprocal motion imparted to said feeder when the direction of rotation of said shaft is reversed.

3. A device for feeding material, comprising a reciprocating feeder, a shaft rotatable in either direction for supplying power to reciprocate the feeder, an eccentric on said shaft imparting reciprocal motion of given amplitude to said feeder when the shaft is rotated in one direction, means for reducing the amplitude of reciprocal motion imparted to said feeder when the direction of rotation of said shaft is reversed, and means for adjusting the amplitude of the lesser reciprocal motion imparted to said feeder.

4. A device for feeding material, comprising a reciprocating feeder, a shaft rotatable in either direction for supplying power to reciprocate said feeder, eccentric means on said shaft for imparting reciprocal motion to said feeder and means associated with said eccentric and said reciprocating feeder whereby the reciprocating motion of the feeder is of given amplitude when the shaft is rotated in one direction and of different amplitude when the shaft is rotated in the opposite direction.

5. A device for feeding material, comprising a reciprocating feeder, a shaft rotatable in either direction for supplying power to reciprocate said feeder, eccentric means on said shaft for imparting reciprocal motion to said feeder and means associated with said eccentric and said reciprocating feeder whereby the reciprocating motion of the feeder is of given amplitude when the shaft is rotated in one direction and of different amplitude when the shaft is rotated in the opposite direction, and means for regulating the length of stroke of said feeder when the shaft is rotated in at least one direction.

6. A device for feeding material, comprising a reciprocating feeder, a shaft rotatable in either direction for supplying power to reciprocate the feeder, and an eccentric operatively connected to said feeder and shaft, said eccentric and shaft being bodily movable relative to each other to vary the amplitude of reciprocal motion imparted to said feeder when the direction of rotation of said shaft is reversed.

7. A device for feeding material, comprising a reciprocating feeder, a shaft rotatable in either direction for supplying power to reciprocate the feeder, and an eccentric operatively connected to said feeder and shaft, said eccentric and shaft being bodily movable relative to each other to vary the amplitude of reciprocal motion imparted to said feeder when the direction of rotation of said shaft is reversed, and means for regulating the length of stroke of said feeder when the shaft is rotated in at least one direction.

8. A device for feeding material, comprising a reciprocating feeder, a shaft rotatable in either direction for supplying power to reciprocate the feeder, an eccentric operatively connected to said feeder, and a crank arm rigidly connected to said shaft and pivotally connected to said eccentric, said eccentric and shaft being bodily movable relative to each other to vary the amplitude of reciprocal motion imparted to said feeder when the direction of rotation of said shaft is reversed.

9. A device for feeding material, comprising a reciprocating feeder, a shaft rotatable in either direction for supplying power to reciprocate the feeder, an eccentric operatively connected to said feeder and provided with a slot for receiving said shaft, and a crank arm rigidly connected to said shaft and pivotally connected to said eccentric, said eccentric and shaft being bodily movable relative to each other to vary the amplitude of reciprocal motion imparted to said feeder when the direction of rotation of said shaft is reversed.

WILLIAM H. VENABLE.